United States Patent
Duale et al.

(10) Patent No.: US 10,713,139 B2
(45) Date of Patent: *Jul. 14, 2020

(54) SYSTEM LEVEL TESTING OF MULTI-THREADING FUNCTIONALITY INCLUDING BUILDING INDEPENDENT INSTRUCTION STREAMS WHILE HONORING ARCHITECTURALLY IMPOSED COMMON FIELDS AND CONSTRAINTS

(71) Applicant: INTERNATIONAL BUSINESS MACHINES CORPORATION, Armonk, NY (US)

(72) Inventors: Ali Y Duale, Poughkeepsie, NY (US); Shailesh R. Gami, Poughkeepsie, NY (US); Dennis Wittig, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/869,641

(22) Filed: Sep. 29, 2015

(65) Prior Publication Data

US 2016/0232071 A1 Aug. 11, 2016

Related U.S. Application Data

(63) Continuation of application No. 14/618,693, filed on Feb. 10, 2015.

(51) Int. Cl.
*G06F 11/28* (2006.01)
*G06F 11/26* (2006.01)
(Continued)

(52) U.S. Cl.
CPC .......... *G06F 11/28* (2013.01); *G06F 9/3851* (2013.01); *G06F 11/26* (2013.01); *G06F 11/3664* (2013.01)

(58) Field of Classification Search
CPC ...... G06F 11/28; G06F 11/26; G06F 11/3664; G06F 9/30145; G06F 8/75; G06F 11/3616
See application file for complete search history.

(56) References Cited

U.S. PATENT DOCUMENTS 5,774,358 A * 6/1998 Shrote .............. G01R 31/31704
700/86
8,370,806 B2 * 2/2013 Codrescu .............. G06F 9/3005
714/35

(Continued)

OTHER PUBLICATIONS

Foutris, M. Psarakis, D. Gizopoulos, A. Gonzalez, "MT-SBST: Self-test optimization in multithreaded multicore architectures", IEEE International Test Conference, pp. 1-10, 2010.*

(Continued)

*Primary Examiner* — Keith E Vicary
(74) *Attorney, Agent, or Firm* — Teddi Maranzano, Esq.; Kevin P. Radigan, Esq.; Heslin Rothenberg Farley & Mesiti P.C.

(57) ABSTRACT

A testing facility is provided to test the multithreading functionality of a computing environment. The testing of this functionality includes building independent instruction streams to test threads of a multi-threaded environment while honoring architecturally imposed common fields and constraints, if any, of the threads. Certain features may be enabled/disabled for all threads. The instruction streams generated for testing this functionality may vary from being identical for all the threads being tested to being totally different, such as having different architectures.

11 Claims, 8 Drawing Sheets

(51) Int. Cl.
  *G06F 11/36* (2006.01)
  *G06F 9/38* (2018.01)

(56) References Cited

U.S. PATENT DOCUMENTS

| | | | | |
|---|---|---|---|---|
| 8,413,120 | B2* | 4/2013 | Emberling | G06F 11/3072 717/124 |
| 8,484,516 | B2* | 7/2013 | Giannini | G06F 11/3636 714/12 |
| 9,311,205 | B2* | 4/2016 | Emberling | G06F 11/3072 |
| 2006/0149927 | A1* | 7/2006 | Dagan | G06F 9/30076 712/43 |
| 2006/1049927 | | 7/2006 | Dagan | |
| 2006/0212759 | A1* | 9/2006 | Campbell | G06F 11/36 714/38.14 |
| 2007/0288899 | A1 | 12/2007 | Fanning | |
| 2008/0059769 | A1* | 3/2008 | Rymarczyk | G06F 9/30181 712/209 |
| 2009/0083753 | A1* | 3/2009 | Tzruya | G06F 9/4843 718/107 |
| 2011/0225400 | A1* | 9/2011 | De Poy Alonso | G06F 11/263 712/227 |
| 2012/0124338 | A1* | 5/2012 | Webber | G06F 9/3851 712/213 |
| 2013/0191105 | A1 | 7/2013 | Abdirashid | |
| 2013/0231888 | A1* | 9/2013 | Sugimura | G06F 11/263 702/123 |
| 2014/0108871 | A1* | 4/2014 | Emberling | G06F 11/3072 714/45 |
| 2014/0359629 | A1* | 12/2014 | Ronen | G06F 9/4881 718/102 |
| 2015/0277948 | A1* | 10/2015 | Bradbury | G06F 9/45558 718/1 |

OTHER PUBLICATIONS

A.Apostolakis, M.Psarakis, D.Gizopoulos, A.Paschalis, I.Parulkar, "Exploiting Thread-Level Parallelism in Functional Self-Testing of CMT Processors", IEEE European Test Symposium (ETS), pp. 33-38, 2009.*

L.Chen, S.Ravi, A.Raghunathan, S.Dey, "A Scalable Software-Based Self-Test Methodology for Programmable Processors", IEEE/ACM Design Automation Conf., pp. 548-553, 2003.*

Patterson, David A., and John L. Hennessy. Computer Organization and Design: The Hardware/software Interface. 3rd ed. Burlington, MA: Morgan Kaufmann, n.d. Print. (3rd Edition pp. 100-101, 348, 350, 383, 449, 9-25, 512, and 9-32).*

"z/Architecture—Principles of Operation," Publication No. SA22-7832-09, $10^{th}$ Edition, Sep. 2012, 1568 pages.

Gschwind, Michael K., "Managing Processing Associated with Selected Architectural Facilities," U.S. Appl. No. 14/217,824, filed Mar. 18, 2014, 119 pages.

Gainey, Charles W., Jr., et al., "Architectural Mode Configuration," U.S. Appl. No. 14/217,840, filed Mar. 18, 2014, 110 pages.

Gainey, Charles W., Jr., et al., "Common Boot Sequence for Control Unit Able to Be Initialized in Multiple Architectures," U.S. Appl. No. 14/217,800, filed Mar. 18, 2014, 114 pages.

Mell, Peter and Tim Grance, "The NIST Definition of Cloud Computing," National Institute of Standards and Technology, Information Technology Laboratory, Special Publication 800-145, Sep. 2011, 7 pages.

Duale et al., "System Level Testing of Multi-Threading Functionality," U.S. Appl. No. 14/618,693, filed Feb. 10, 2015, pp. 1-42.

List of IBM Patents or Patent Applications Treated as Related, Mar. 16, 2016, 2 pages.

Final Office Action for U.S. Appl. No. 14/618,693 dated Jul. 13, 2017, pp. 1-43.

Office Action for U.S. Appl. No. 14/618,693 dated Jan. 25, 2017, pp. 1-36.

Fourtris, N. et al., "MT-SBST: Self-Test Optimization in Multithreaded Multicore Architectures," IEEE International Test Conference, Nov. 2010, pp. 1-10.

Apostolakis, A. et al., "Exploiting Thread-Level Parallelism in Functional Self-Testing of Cmt Processors," IEEE European Test Symposium (ETS), May 2009, pp. 33-38.

Chen, L. et al., "A Scalable Software-Based Self-Test methodology for Programmable Processors," IEEE/ACM Design Automation Conf., Jun. 2003, 2003, pp. 548-553.

Patterson, D. et al., "Computer Organization and Design: The Hardware/Software Interface," $3^{rd}$ Edition, Aug. 2004, pp. 100-101, 348, 350, 383, 449, 9-25 and 9-32 (+ cover pages).

* cited by examiner

SYSTEM LEVEL TESTING OF MULTI-THREADING FUNCTIONALITY INCLUDING BUILDING INDEPENDENT INSTRUCTION STREAMS WHILE HONORING ARCHITECTURALLY IMPOSED COMMON FIELDS AND CONSTRAINTS

This application is a continuation of co-pending U.S. patent application Ser. No. 14/618,693, filed Feb. 10, 2015, entitled "SYSTEM LEVEL TESTING OF MULTI-THREADING FUNCTIONALITY," which is hereby incorporated herein by reference in its entirety.

BACKGROUND

One or more aspects relate, in general, to multi-threaded computing environments, and in particular, to testing of such environments.

Multi-threaded processors include a plurality of hardware threads that can execute concurrently. One example of a multi-threaded processor is a simultaneous multi-threaded (SMT) processor. In simultaneous multithreading, instructions from more than one thread can be executing in any given instruction pipeline stage at a time. Thus, simultaneous multithreading allows multiple independent threads of execution to better utilize the resources provided by the processor architecture.

Simultaneous multithreading makes each processor of a virtual machine appear as n-processors, called threads, to applications.

SUMMARY

Shortcomings of the prior art are overcome and additional advantages are provided through the provision of a computer-implemented method of facilitating testing of a multi-threaded computing environment. The method includes, for instance, obtaining an indication of a number of threads of a core to be tested; assigning attributes to the number of threads to be tested, wherein the assigning the attributes comprises setting states for the number of threads to be tested, wherein at least one state of one thread of the number of threads to be tested is different from at least one state of another thread of the number of threads to be tested, the at least one state comprising an architecture state, wherein the architecture state of the one thread is different than the architecture state of the other thread; generating a number of instruction streams for the number of threads to be tested, wherein the generating, for an instruction stream of the number of instruction streams, includes selecting one or more instructions to be included in the instruction stream; and executing the instruction stream generated for the one thread to test the one thread.

Computer program products and systems relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

In accordance with one or more aspects, a testing facility is provided to test the multithreading functionality of a computing environment. The testing of this functionality includes building independent instruction streams to test threads of a multi-threaded environment while honoring architecturally imposed common fields and constraints, if any, of the threads. For example, certain functions may be enabled/disabled for all threads.

The instruction streams generated for testing this functionality may vary from being identical for all the threads being tested to being totally different, such as testing different architectures. Many variations are possible.

In one example, multiple threads of a single core are being tested, and the testing of the multiple threads of the single core is performed concurrently to ensure that the multiple threads behave as expected when executing concurrently, even if the multiple threads are testing different architectures.

Figure 1:
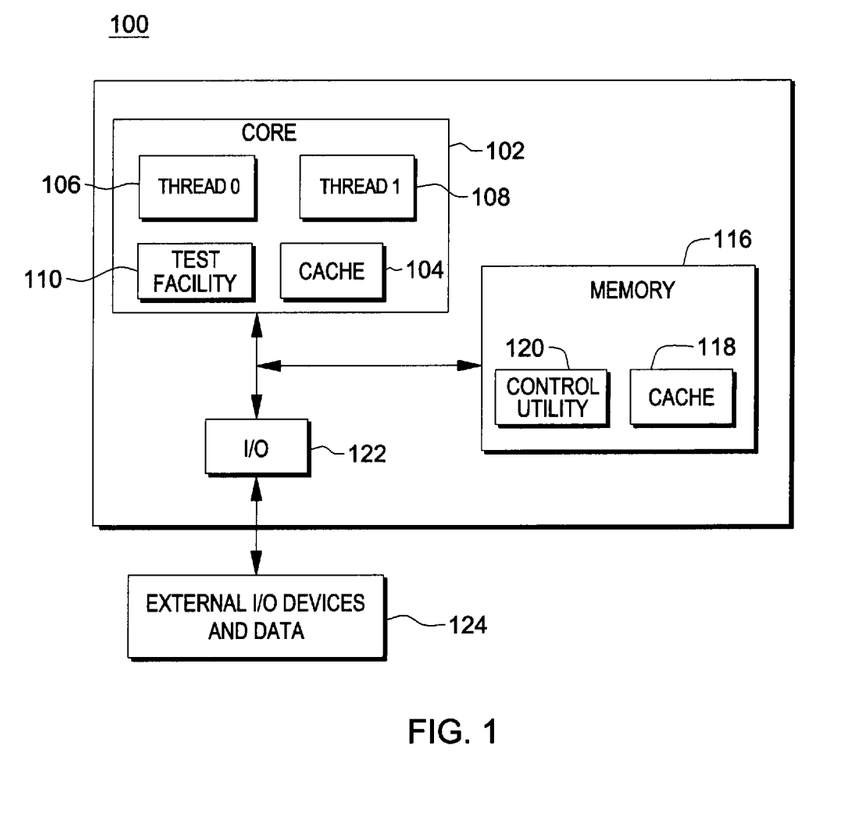
FIG. 1 depicts one example of a computing environment to incorporate and use one or more aspects of a test facility to test the multithreading functionality of the computing environment.

One example of a computing environment to incorporate and use one or more aspects of a multithreading testing capability is described with reference to FIG. 1. Referring to FIG. 1, in one example, a computing environment 100 is based on the z/Architecture, offered by International Business Machines (IBM®) Corporation, Armonk, N.Y. The z/Architecture is described in an IBM® Publication entitled "z/Architecture—Principles of Operation," Publication No. SA22-7832-09, 10$^{th}$ Edition, September 2012, which is hereby incorporated by reference herein in its entirety.

Although the computing environment may be based, for instance, on the z/Architecture, in one embodiment, the core of the computing environment may support multiple architectures (i.e., multiple Instruction Set Architectures which may include some of the same instructions and/or functions, as well as some different instructions and/or functions). For instance, the core may concurrently support both the z/Architecture and ESA/390. Other examples are also possible.

Z/ARCHITECTURE, IBM, and Z/VM, Z/OS, POWER, and POWERPC (referenced herein) are registered trademarks of International Business Machines Corporation, Armonk, N.Y. Other names used herein may be registered trademarks, trademarks or product names of International Business Machines Corporation or other companies.

In this example, a computing environment 100 includes a non-partitioned environment which may be implemented to concurrently support multiple architectures, such as, for instance, the z/Architecture and ESA/390 (or one or more other architectures in another embodiment). It includes a core 102 that includes, for instance, one or more caches 104; and one or more threads, e.g., Thread 0 (106), Thread 1 (108), created in accordance with one or more aspects by a multithreading test facility 110. Multithreading test facility 110 includes hardware and/or logic used to test the simultaneous multithreading functionality of the computing environment.

Core 102 is communicatively coupled to a memory 116 having one or more caches 118 and at least one control utility 120, such as an operating system; and to an input/output (I/O) subsystem 122. I/O subsystem 122 is communicatively coupled to external I/O devices and data 124 that may include, for example, data input devices, sensors and/or output devices, such as displays.

Figure 2A:
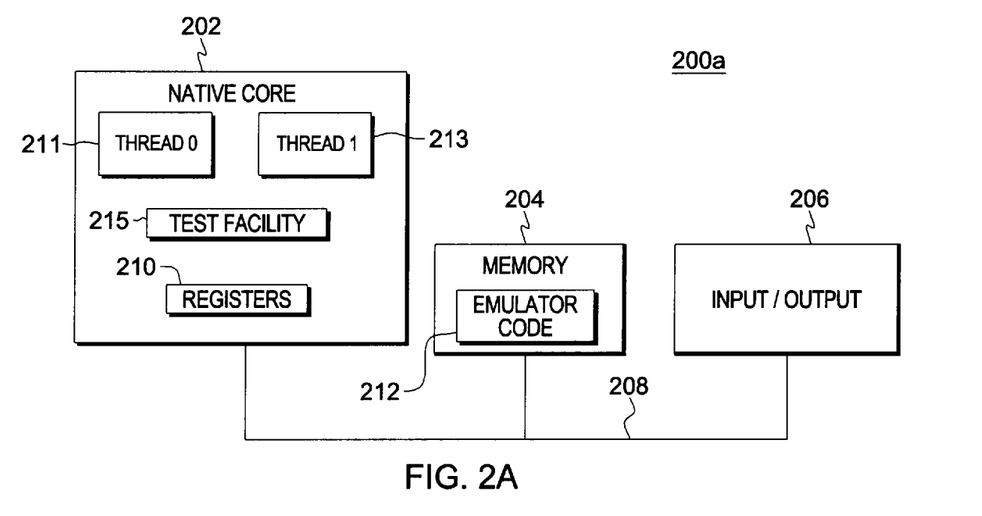
FIG. 2A depicts another example of a computing environment to incorporate and use one or more aspects of a test facility to test the multithreading functionality of the computing environment.

Another embodiment of a computing environment to incorporate and use one or more aspects of a multithreading test facility is described with reference to FIG. 2A. In this example, a computing environment 200a includes, for instance, a native core 202, a memory 204, and one or more input/output devices and/or interfaces 206 coupled to one another via, for example, one or more buses 208 and/or other connections. As examples, computing environment 200a may include a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native core 202 includes one or more native registers 210, such as one or more general purpose registers and/or one or more special purpose registers used during processing within the environment that include information that represents the state of the environment at any particular point in time. Further, native core 202 may include, for instance, one or more threads, e.g., Thread 0 (211), Thread 1 (213), created in accordance with one or more aspects by a multithreading test facility 215. Multithreading test facility 215 includes hardware and/or logic used to test the simultaneous multithreading functionality of the computing environment.

Moreover, native core 202 executes instructions and code that are stored in memory 204. In one particular example, the processor core executes emulator code 212 stored in memory 204. This code enables the computing environment configured in one architecture to emulate one or more other architectures. For instance, emulator code 212 allows machines based on architectures other than the z/Architecture, such as PowerPC processors, Power Systems servers, HP Superdome servers or others, to emulate the z/Architecture and/or other architectures and to execute software and instructions developed based on the z/Architecture and/or other architectures.

Figure 2B:
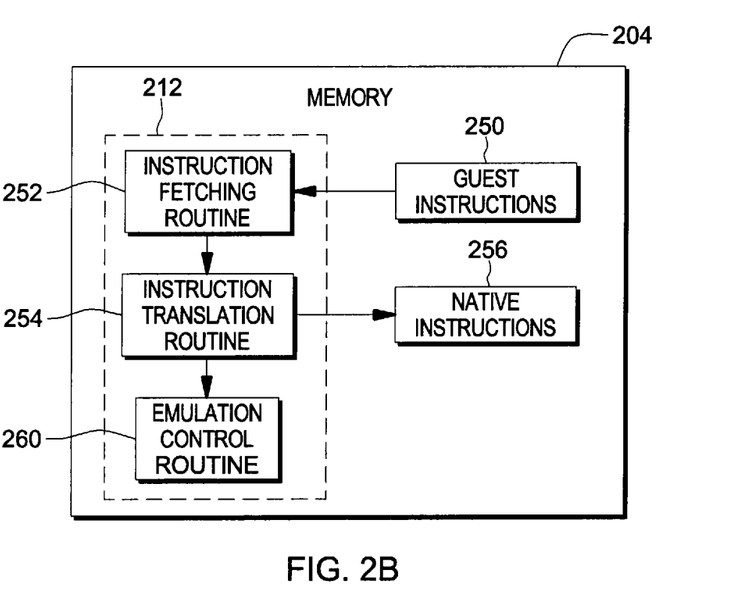
FIG. 2B depicts further details of a memory of the computing environment of FIG. 2A.
Figure 2C:
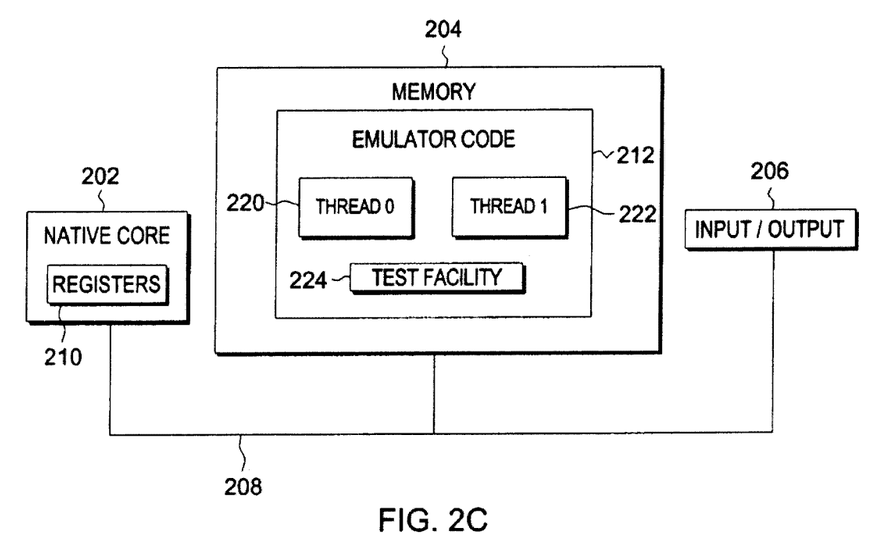
FIG. 2C depicts a further example of a computing environment to incorporate and use one or more aspects of a test facility to test the multithreading functionality of the computing environment.

In a further embodiment, as shown in FIG. 2C, emulator code 212 includes, for instance, one or more emulated threads, e.g., Thread 0 (220), Thread 1 (222), created in accordance with one or more aspects by an emulated multithreading test facility 224. Emulated multithreading test facility 224 includes logic used to test the simultaneous multithreading functionality of the computing environment. The emulated threads and test facility are based on an architecture different from the architecture of native core 202, such as the z/Architecture and/or ESA/390.

Further details relating to emulator code 212 are described with reference to FIG. 2B. Guest instructions 250 stored in memory 204 comprise software instructions (e.g., correlating to machine instructions) that were developed to be executed in an architecture other than that of native core 202. For example, guest instructions 250 may have been designed to execute on a z/Architecture core 102, but instead, are being emulated on native core 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause the native core 202 to execute a routine of native instructions that emulate one or more previously obtained guest instructions and, at the conclusion of such execution, return control to the instruction fetch routine to emulate the obtaining of the next guest instruction or a group of guest instructions. The guest instructions may be instructions of the test facility described herein. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by a native core. In other examples, one or more of the routines or operations are implemented in firmware, hardware, software or some combination thereof. The registers of the emulated processor may be emulated using registers 210 of the native core or by using locations in memory 204. In embodiments, guest instructions 250, native instructions 256 and emulator code 212 may reside in the same memory or may be disbursed among different memory devices.

The computing environments described above are only examples of computing environments that can be used. Other environments, including but not limited to, other non-partitioned environments, partitioned environments, and/or other emulated environments, may be used; embodiments are not limited to any one environment.

One embodiment of logic to test the functionality of multithreading of a computing environment is described with reference to FIG. 3. This logic is performed by, for instance, a processor that includes this test logic. The logic determines whether multithreading within a core is operating as expected. For instance, the logic checks whether multiple threads of a core, that are being tested, e.g., concurrently, are providing expected results based on the test cases being run on those threads. Each thread being tested is expected to behave appropriately for the test case being run on that thread, and it is expected that any thread can run any test case and operate appropriately. That is, for instance, a test cast, Test Case 0, may be run on Thread 0 testing functions of the z/Architecture, and another test case, Test Case 1, may be run on Thread 1 (e.g., concurrently) testing functions of ESA/390. Then, if desired, Test Case 0 may be run on Thread 1 and Test Case 1 may be run on Thread 0 and the results should be the same as before.

In accordance with one aspect, a single test case seed controls the generation for all test cases for all the threads of a core to be tested. This enables test case regeneration to be used for debug and fix verifications. The single test case seed sets up the test cases, as indicated in FIG. 3. For instance, STEPs 300-310 are included in the test case seed. In one embodiment, this single seed is randomly generated at the beginning of a test.

Figure 3:
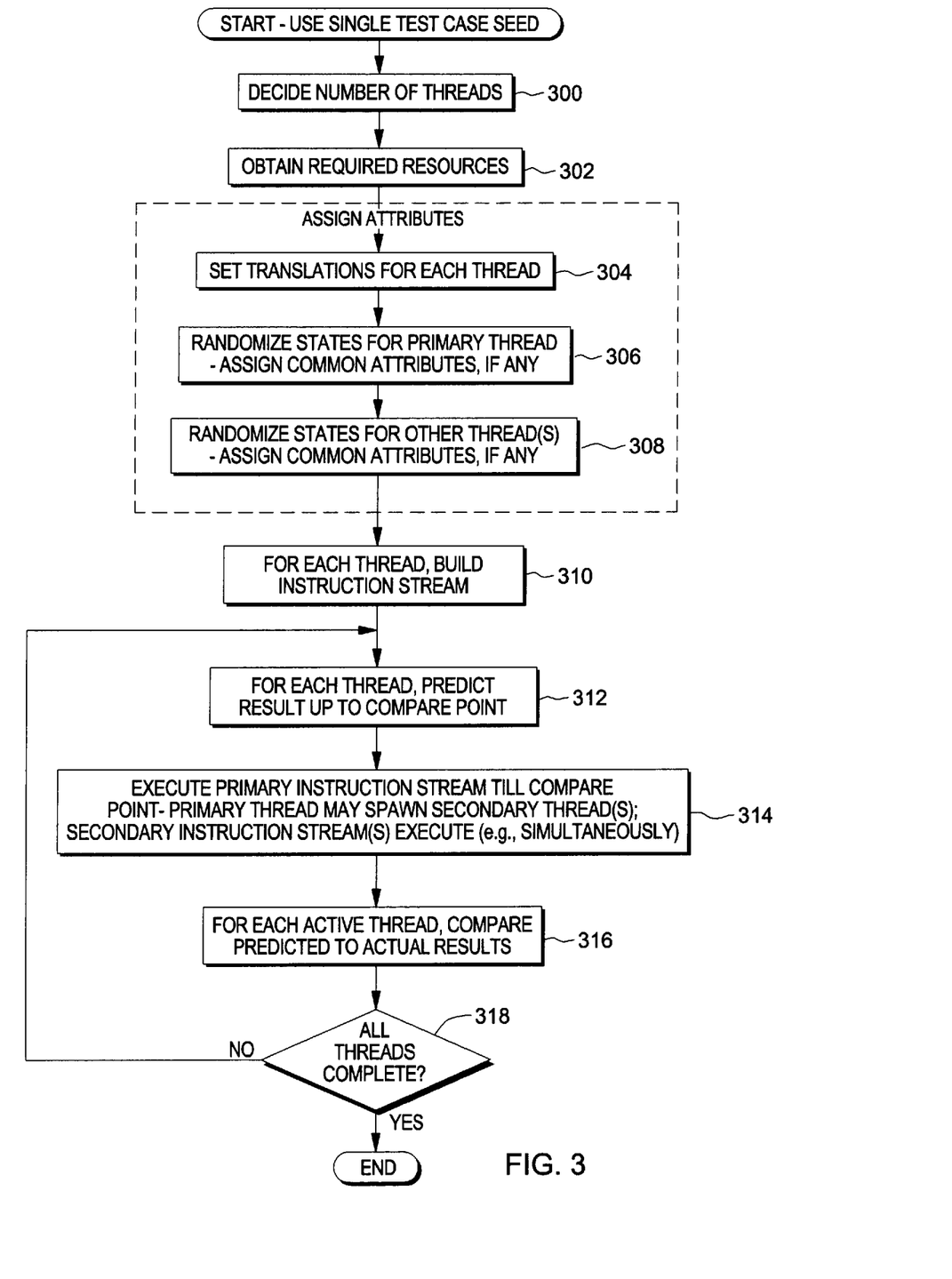
FIG. 3 depicts one example of logic to test the multithreading functionality of a computing environment.

Referring to FIG. 3, initially, a determination is made as to the number of threads to be tested, STEP 300. This number is configurable and may be provided by an operator or set by the testing logic based on provided default values or values determined heuristically. The number of threads that can be tested ranges from 1 to the maximum number of threads supported by the processor. For instance, in an SMT-2 processor, a maximum of two threads are supported, and in an SMT-4 processor, a maximum of four threads are supported. In one implementation, the first thread created is referred to herein as the primary thread and other threads, if any, are secondary threads. The secondary threads are spawned from the primary thread, in this example.

The number of threads to be tested is obtained by the processor, and for each thread to be tested, the processor obtains any required resources, such as pages of storage, buffers, etc., STEP 302. For instance, at least one range of memory is assigned to each thread, and the memory addresses associated with those memory ranges are obtained for the threads.

Additionally, various attributes are assigned to each thread. This includes, for instance, setting an address translation format for each thread, and/or the addressing mode (e.g., 24-bit, 31-bit, 64-bit), STEP 304. Each thread may have the same address translation format and/or addressing mode assigned thereto, or they may be different for the various threads. In one embodiment, to set the addressing mode, one or more indicators (e.g., bits) of a program status word (PSW) associated with the thread are set to indicate the addressing mode. Further, in one example, to set the address translation format, a format is selected, such as, e.g., dynamic address translation (DAT), access register translation (ART), etc. Further, depending on the selected translation format, various indicators in one or more registers and/or the PSW are set and/or tables are populated. As one particular example, if DAT is selected, since DAT is performed, in one implementation, using an address space control element that depends on the current value of address space control bits in the PSW, the bits in the PSW are set to reflect the address space control element to be used. Further, since the address space control element may be contents of a particular control register, the control register is also set. Similarly, if ART is to be used, one or more access registers may be set. Other examples are also possible. Additionally, address translation tables are populated with appropriate information in order to translate a virtual address assigned to a memory unit of a memory range assigned to the thread to a real address.

Moreover, randomized states for a primary thread are set, STEP 306. In one example, the states are set for this thread by setting selected indicators in a state description associated with the thread. The state description is a data structure that includes a number of indicators (e.g., bits), each representing a particular attribute or function for the thread, and by setting a particular indicator to one, that attribute/function is turned on for that thread. In one embodiment, the setting of the states for the primary thread may be randomized to fully test the thread. However, in another embodiment, one or more states may need to be set for each test case as specified by the architecture being tested.

Examples of functions that may be tested (and for which an indicator may be set, e.g., to one) include, for instance, target machine implementation (e.g., architecture having a particular Instruction Set Architecture), enabling/disabling different execution types via architected controls, the number of guest levels, enabling/disabling and/or setting the ranges for execution event monitoring, enabling/disabling certain functions, such as floating point controls, etc., via architected controls. Many possibilities exist. For example, any attribute/function that has an indicator in, for instance, the state description associated with the thread that may be turned on/off may be tested.

In addition to setting the states for the primary thread, randomized states for other threads to be spawned by the primary thread, if any, are also set in the state description for those threads, STEP 308. For example, if two threads are to be tested, as indicated in STEP 300, then states for the second thread, which will be spawned by the primary thread, are set in the state description associated with that thread. Again, these states may be randomized. However, in one embodiment, it may be that some states are common for the primary and secondary threads, and thus, are to be set the same. Further, in one embodiment, at least some of the states may be different. For instance, the primary thread may be set for one architecture (e.g., z/Architecture), and the secondary thread may be set for another architecture (e.g., ESA/390). As an example, based on the state description controls of a given thread, an architecture mode is selected to be, e.g., z/Architecture or ESA/390. In this case, different threads may be selected to test different modes of the system under test. In the event that different threads are set to execute different architectures, threads belonging to the same core may simultaneously execute the same instructions while producing different results based on the selected architecture for each thread. For example, in one thread, an instruction that is valid may be invalid in the other thread (e.g., z/Architecture is a superset of ESA/390, so when in ESA/390 not all instructions/functions available in z/Architecture are executable).

Further, for each thread that has been marked to be active (i.e., to be tested), an instruction stream, also referred to as a test case, is built to, for instance, test the thread, STEP 310. The instruction stream is built by, for instance, randomly selecting instructions from one or more pools of instructions. The pools of instructions may include, for example, a plurality of pools of instructions, in which each pool has different types of instructions (e.g., one pool has instructions with data exception conditions, and another pool has different types of instructions without data exception conditions, one pool may have instructions that test floating point functions, pools may be for different architectures, etc.). The instructions randomly selected from the pools depend on what is to be tested. For example, if data exceptions are to be tested, then one or more data exception condition instructions are selected from the data exception pool and one or more other instructions may be randomly selected from one or more other pools. Many variations are possible, and again, depend on what is to be tested on the thread.

Additionally, results are predicted for the instruction stream built for each thread to be tested, STEP 312. These predicted results are results up to a compare point of the instruction stream. A compare point is a valid point, such as a valid interrupt point, in which results of the test case being executed on the thread are able to be compared to expected results.

The instruction stream of the primary thread, referred to herein as the primary instruction stream, is executed until the compare point, STEP 314. The primary thread may spawn one or more secondary threads depending on the number of threads selected to be tested. This includes, for instance, turning on an indicator in the state description of the secondary thread indicating it is to be active, and setting a pointer from the primary thread state description to the secondary thread state description. Additionally, if the secondary thread is the last thread to be spawned, then a pointer in the state description of the secondary thread is set to point to the state description of the primary thread, such that a circular ring is formed. In a further embodiment, one or more controls of the secondary threads, including the active or valid control, may be overridden by the indicators set in the state description for the primary thread; thus, the corresponding indicators set in the state descriptions of the secondary threads are ignored.

Thereafter, for each thread running, the instruction stream is executed. If the instruction stream is executed to the compare point, then the actual results of the instruction stream are compared to the predicted results for that instruction stream, STEP 316. If the actual results match the expected results, then the multithreading function has passed its test case; otherwise, an error is reported and the multithreading functionality may not be operating as expected.

However, if the instruction stream prematurely ends by, for instance, being forced out by another thread completing, by reaching a predefined number of units of operation for the instruction stream, by transactional abort, or by reaching an internal condition (e.g., a timer), then the instruction stream has not reached a compare point and at least a part of the instruction stream is to be re-executed (e.g., the instruction stream may be re-driven from the point of exit or may be re-executed in its entirety (e.g., in transactional execution mode, it may be re-executed from the beginning)).

A determination is made as to whether all the threads are complete in execution of their instruction streams (i.e., have reached a compare point), INQUIRY 318. If all of the threads are not complete, then processing continues to STEP 312. Otherwise, processing ends.

As described herein, simultaneous multithreading makes each processor of a virtual machine appear as n-processors, called threads, to the applications. The simultaneous multithreading function is enabled by setting certain bits of a state description of the host machine. This in turn enables the machine to look for a number of state descriptions, each pointing to the next state description, making a circular ring. Each state description represents a thread. Testing of this multithreading function includes building independent test streams while honoring architecturally imposed common fields and constraints, if any. For example, certain functions may be enabled/disabled for all threads. Similarly, the presence or absence of certain functions or attributes is decided based on state descriptors of the primary thread.

The instruction streams generated for testing this function could vary from being identical for all threads being tested to being valid for different architectures. In one embodiment, maximum contention among different threads for hardware/firmware resources is created.

The generation of pseudo-random test cases for SMT starts with deciding the number of threads per core to be tested. For instance, an operator may decide how many threads are to participate in the testing. Next, test cases are randomized for the primary thread, as well as states for the secondary threads, while taking into consideration the fact that certain states of the primary thread may be required to propagate to other threads. Further, resources, such as buffers and address translations for each thread, are acquired. One or more aspects allow randomly (or based on operator request) disabling of SMT testing as defined by the architecture and, in that case, builds non-SMT cases.

After the states, buffers and translations for all threads are established, instruction streams are generated for each thread. In general, instruction stream generation includes deciding which features and/or controls to be enabled, the length of the streams and allowed exceptions/interruptions. As examples, the instruction streams may be identical for any given pass; alternatively, the random states for each thread may create instruction streams of mixed architectures to be generated. Such mixture of architectures stresses a given core to simultaneously execute two different architectures at the same execution cycle.

The result prediction for all threads is made to be transparent such that the instruction streams are simulated serially until all threads come to their respective compare points. Then, the execution (actual machine results) is commenced by starting the instruction stream at the host level (e.g., core level) which in turn invokes the execution of the enabled threads' instruction streams. In one implementation, execution ends when at least one thread either reaches an interrupt point, is interrupted or the core determines that it has executed a machine decided number of units of operations. Upon such exit, it is determined if all threads are at compare points. Based on such checks, test cases could be re-driven into execution starting at the point of interruption. Based on all of the threads reaching compare points, the expected results are compared to their respective actual results. Other implementations may wait until each thread reaches an interrupt point, is interrupted or the core determines that it has executed a machine decided number of units of operation.

In accordance with one or more aspects, different threads of a same core may simultaneously execute randomly built tests cases. Further, different threads of the same core may simultaneously execute test cases based on different architectures. A single test case seed controls the generation for the test cases for the threads of a core.

In one or more aspects, an address space for a number of threads is confined to a single and contiguous block of storage. To set the address space for a given zone, a zone origin and limit (length) for the core are set. Later the block of storage is partitioned such that it contains blocks of storage for n-number of threads, where n is the number of threads to be tested. Further, in one or more aspects, pseudo-random test cases are built for each thread while keeping architecturally required common fields, if any, the same; states for each thread are randomized to generate such instruction streams; mixed architectures are allowed (including different machine levels), in which any thread executes any of the possible architectures; the threads to be run is selectable, ranging from one to the maximum number of threads; a simulation is performed to serially predict the result of the threads (the result prediction is unaware of multithreading); results for the threads are compared; for readability and error analysis, multiple instruction streams are traced for a given multithreading test case, when needed or desired; and a single seed is provided for all thread stream generations.

As used herein, storage, central storage, main storage, memory and main memory are used interchangeably, unless otherwise noted, implicitly by usage or explicitly.

Figure 4:
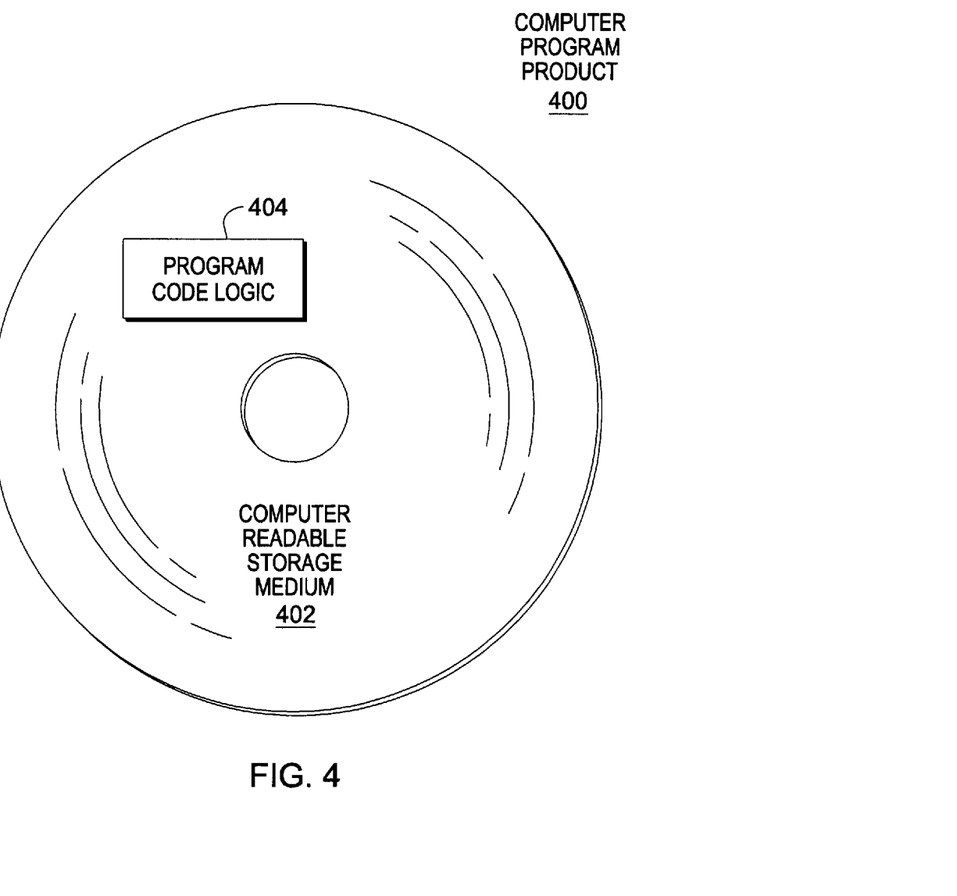
FIG. 4 depicts one embodiment of a computer program product incorporating one or more aspects.

Referring to FIG. 4, in one example, a computer program product 400 includes, for instance, one or more non-transitory computer readable storage media 402 to store computer readable program code means, logic and/or instructions 404 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

In a further embodiment, one or more aspects relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
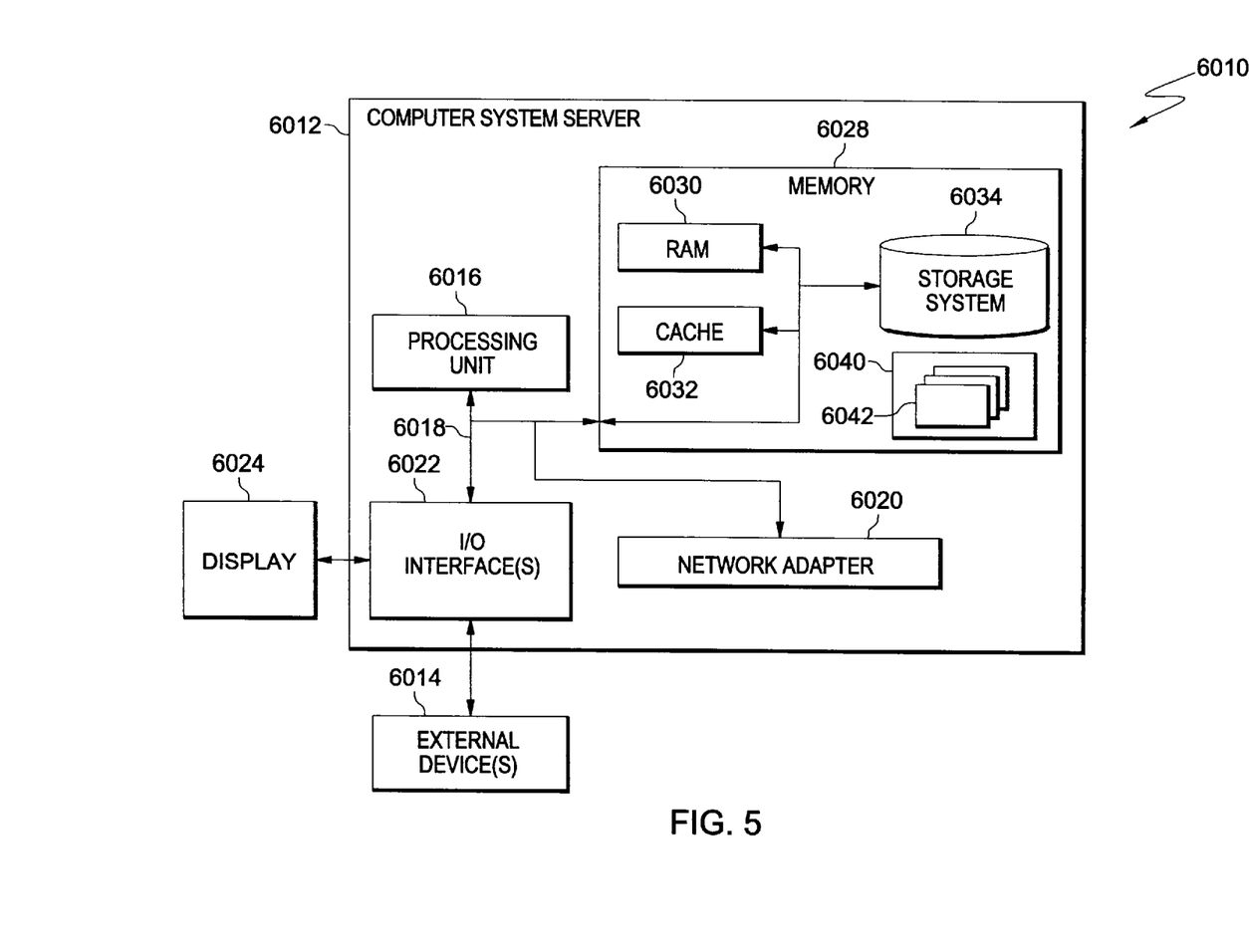
FIG. 5 depicts one embodiment of a cloud computing node.

Referring now to FIG. 5, a schematic of an example of a cloud computing node is shown. Cloud computing node 6010 is only one example of a suitable cloud computing node and is not intended to suggest any limitation as to the scope of use or functionality of embodiments of the invention described herein. Regardless, cloud computing node 6010 is capable of being implemented and/or performing any of the functionality set forth hereinabove.

In cloud computing node 6010 there is a computer system/server 6012, which is operational with numerous other general purpose or special purpose computing system environments or configurations. Examples of well-known computing systems, environments, and/or configurations that may be suitable for use with computer system/server 6012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 6012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 6012 may be practiced in distributed cloud computing environments where tasks are performed by remote processing devices that are linked through a communications network. In a distributed cloud computing environment, program modules may be located in both local and remote computer system storage media including memory storage devices.

Figure 6:
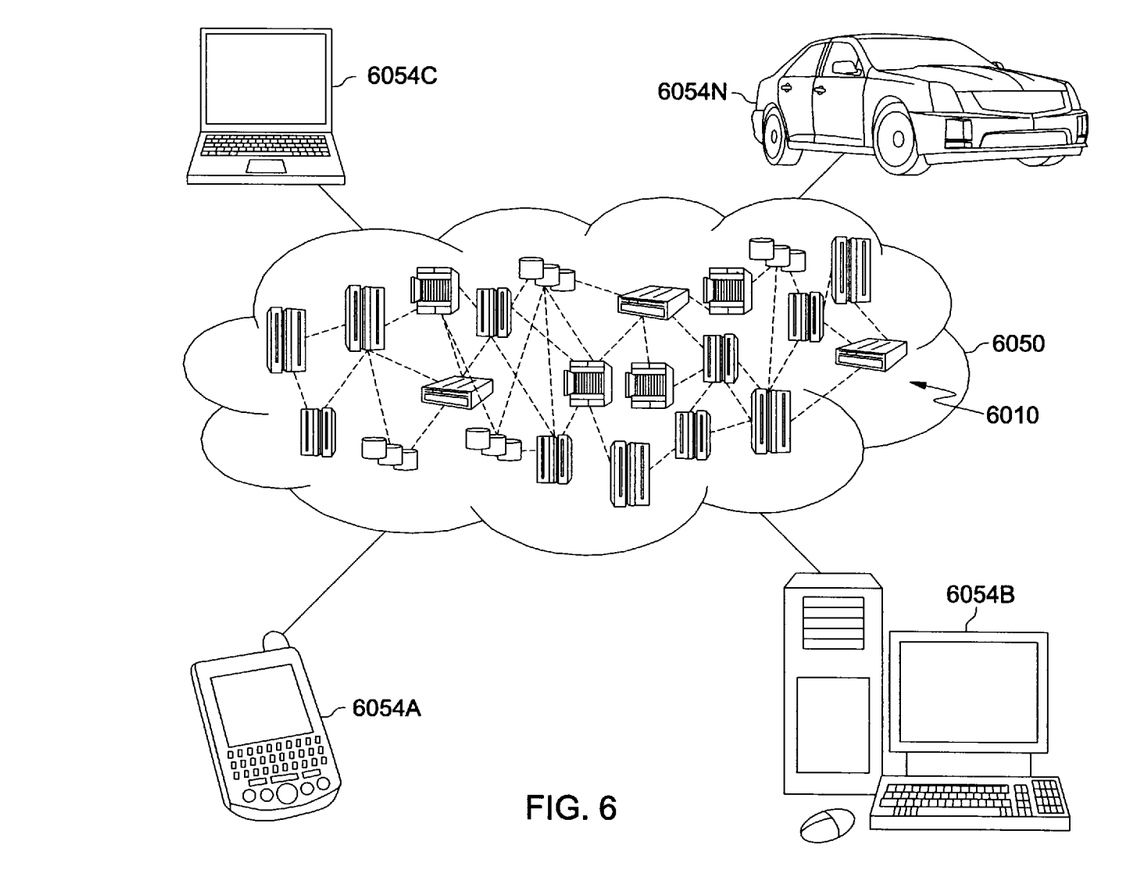
FIG. 6 depicts one embodiment of a cloud computing environment.

As shown in FIG. 6, computer system/server 6012 in cloud computing node 6010 is shown in the form of a general-purpose computing device. The components of computer system/server 6012 may include, but are not limited to, one or more processors or processing units 6016, a system memory 6028, and a bus 6018 that couples various system components including system memory 6028 to processor 6016.

Bus 6018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 6012 typically includes a variety of computer system readable media. Such media may be any available media that is accessible by computer system/server 6012, and it includes both volatile and non-volatile media, removable and non-removable media.

System memory 6028 can include computer system readable media in the form of volatile memory, such as random access memory (RAM) 6030 and/or cache memory 6032. Computer system/server 6012 may further include other removable/non-removable, volatile/non-volatile computer system storage media. By way of example only, storage system 6034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 6018 by one or more data media interfaces. As will be further depicted and described below, memory 6028 may include at least one program product having a set (e.g., at least one) of program modules that are configured to carry out the functions of embodiments of the invention.

Program/utility 6040, having a set (at least one) of program modules 6042, may be stored in memory 6028 by way of example, and not limitation, as well as an operating system, one or more application programs, other program modules, and program data. Each of the operating system, one or more application programs, other program modules, and program data or some combination thereof, may include an implementation of a networking environment. Program modules 6042 generally carry out the functions and/or methodologies of embodiments of the invention as described herein.

Computer system/server 6012 may also communicate with one or more external devices 6014 such as a keyboard, a pointing device, a display 6024, etc.; one or more devices that enable a user to interact with computer system/server 6012; and/or any devices (e.g., network card, modem, etc.) that enable computer system/server 6012 to communicate with one or more other computing devices. Such communication can occur via Input/Output (I/O) interfaces 6022. Still yet, computer system/server 6012 can communicate with one or more networks such as a local area network (LAN), a general wide area network (WAN), and/or a public network (e.g., the Internet) via network adapter 6020. As depicted, network adapter 6020 communicates with the other components of computer system/server 6012 via bus 6018. It should be understood that although not shown, other hardware and/or software components could be used in conjunction with computer system/server 6012. Examples include, but are not limited to: microcode, device drivers, redundant processing units, external disk drive arrays, RAID systems, tape drives, and data archival storage systems, etc.

Referring now to FIG. 6, illustrative cloud computing environment 6050 is depicted. As shown, cloud computing environment 6050 comprises one or more cloud computing nodes 6010 with which local computing devices used by cloud consumers, such as, for example, personal digital assistant (PDA) or cellular telephone 6054A, desktop computer 6054B, laptop computer 6054C, and/or automobile computer system 6054N may communicate. Nodes 6010 may communicate with one another. They may be grouped (not shown) physically or virtually, in one or more networks, such as Private, Community, Public, or Hybrid clouds as described hereinabove, or a combination thereof. This allows cloud computing environment 6050 to offer infrastructure, platforms and/or software as services for which a cloud consumer does not need to maintain resources on a local computing device. It is understood that the types of computing devices 6054A-N shown in FIG. 6 are intended to be illustrative only and that computing nodes 6010 and cloud computing environment 6050 can communicate with any type of computerized device over any type of network and/or network addressable connection (e.g., using a web browser).

Figure 7:
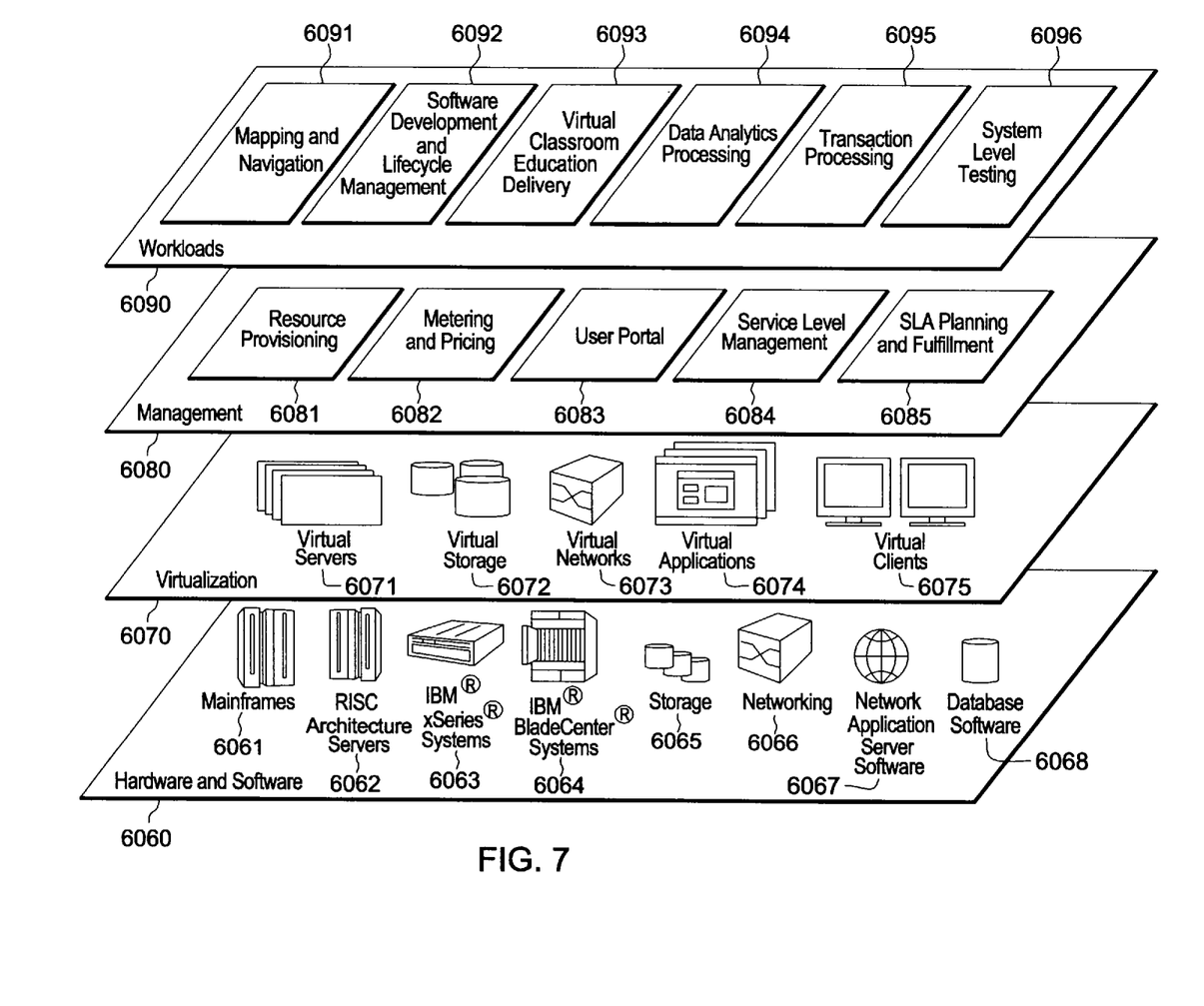
FIG. 7 depicts one example of abstraction model layers.

Referring now to FIG. 7, a set of functional abstraction layers provided by cloud computing environment 6050 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 6060 includes hardware and software components. Examples of hardware components include mainframes 6061; RISC (Reduced Instruction Set Computer) architecture based servers 6062; IBM xSeries® systems 6063; IBM BladeCenter® systems 6064; storage devices 6065; networks and networking components 6066. In some embodiments, software components include network application server software 6067 and database software 6068.

Virtualization layer 6070 provides an abstraction layer from which the following examples of virtual entities may be provided: virtual servers 6071; virtual storage 6072; virtual networks 6073, including virtual private networks; virtual applications 6074 and operating systems; and virtual clients 6075.

In one example, management layer 6080 may provide the functions described below. Resource provisioning 6081 provides dynamic procurement of computing resources and other resources that are utilized to perform tasks within the cloud computing environment. Metering and Pricing 6082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 6083 provides access to the cloud computing environment for consumers and system administrators. Service level management 6084 provides cloud computing resource allocation and management such that required service levels are met. Service Level Agreement (SLA) planning and fulfillment 6085 provide pre-arrangement for, and procurement of, cloud computing resources for which a future requirement is anticipated in accordance with an SLA.

Workloads layer 6090 provides examples of functionality for which the cloud computing environment may be utilized. Examples of workloads and functions which may be provided from this layer include: mapping and navigation 6091; software development and lifecycle management 6092; virtual classroom education delivery 6093; data analytics processing 6094; transaction processing 6095; and system level testing 6096.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating testing of a multi-threaded computing environment, said computer-implemented method comprising:

obtaining an indication of a number of threads of a core to be tested, wherein the number of threads includes a primary thread and one or more secondary threads, the primary thread being an initial thread of the number of threads to be created, the one or more secondary threads to be spawned from the primary thread;

assigning, by a processor, attributes to the number of threads to be tested, wherein the assigning attributes comprises determining one or more testing attributes selected for testing and setting states for the number of threads to be tested in order to test the one or more testing attributes, the setting the states comprising setting one or more indicators to specify that the one or more testing attributes are selected for testing, wherein at least one state of one thread of the number of threads to be tested is different from at least one state of an other thread of the number of threads to be tested, the at least one state comprising an architecture state, wherein the architecture state of the one thread is different than the architecture state of the other thread, the architecture state of the one thread being based on one architecture having one instruction set architecture and the architecture state of the other thread being based on another architecture having an other instruction set architecture, the other instruction set architecture being different from the one instruction set architecture;

generating a number of instruction streams for the number of threads to be tested, wherein the generating, for an instruction stream of the number of instruction streams, comprises randomly selecting one or more instructions to be included in the instruction stream, in which a presence or absence of one or more functions or attributes is decided based on a selected thread;

executing a respective instruction stream of the number of instruction streams generated for the primary thread to test the primary thread, wherein the executing comprises executing the respective instruction stream to a compare point of the primary thread to generate results, in which, based on reaching the compare point, the generated results are compared to respective expected results of the primary thread to determine whether testing of the primary thread was successful, the generated results being based on the executing the instruction stream; and wherein the executing the respective instruction stream generated for the primary thread includes spawning, by the primary thread, the one or more secondary threads wherein the one or more secondary threads spawned are based on the indication of the number of threads of the core to be tested.

2. The computer-implemented method of claim 1, wherein the primary thread comprises the one thread, and wherein the method further comprises executing the one or more secondary threads, the executing the one or more secondary threads including executing another instruction stream on the other thread to test the other thread, wherein testing of the other thread is independent from testing the primary thread.

3. The computer-implemented method of claim 1, wherein the assigning attributes comprises setting one address translation format for the one thread and another address translation format for the other thread, wherein the address translation format for the one thread is the same as the address translation format for the other thread.

4. The computer-implemented method of claim 1, wherein the assigning attributes comprises accessing a single test case seed to obtain the attributes for the number of threads.

5. The computer-implemented method of claim 1, wherein the assigning of attributes comprises:

determining whether one or more attributes are to be common to a plurality of threads of the number of threads of the core to be tested; and based on determining one or more attributes are to be common, assigning the one or more attributes that are to be common to the plurality of threads.

6. The computer-implemented method of claim 5, wherein other attributes to be assigned to the plurality of threads are randomly selected.

7. The computer-implemented method of claim 1, wherein a plurality of threads of the number of threads of the core to be tested are executed simultaneously.

8. The computer-implemented method of claim 1, wherein the one or more testing attributes are selected from a group consisting of: target machine implementation, enabling/disabling different execution types, number of guest levels, enabling/disabling execution event monitoring, setting ranges for execution event monitoring, and enabling/disabling a function.

9. The computer-implemented method of claim 1, wherein the primary thread comprises the one thread, and the spawning of the one or more secondary threads includes spawning the other thread, the spawning the other thread including setting a pointer from a state description of the one thread to a state description of the other thread.

10. The computer-implemented method of claim 1, wherein the assigning attributes comprises setting one address translation format for the one thread and another address translation format for the other thread, wherein the address translation format for the one thread is different from the address translation format for the other thread.

11. The computer-implemented method of claim 1, wherein the obtaining the indication of the number of threads comprises obtaining the indication of the number of threads to be tested to test multi-threading functionality of the multi-threaded computing environment, the number of threads to be tested being configurable.

* * * * *